US006619035B2

(12) United States Patent
Matsuoka et al.

(10) Patent No.: US 6,619,035 B2
(45) Date of Patent: Sep. 16, 2003

(54) EXHAUST EMISSION CONTROL DEVICE OF INTERNAL COMBUSTION ENGINE

(75) Inventors: Hiroki Matsuoka, Toyota (JP); Souichi Matsushita, Toyota (JP); Yukihiro Tsukasaki, Toyota (JP); Kotaro Hayashi, Toyota (JP); Shinobu Ishiyama, Toyota (JP); Yasuhiro Ohtsubo, Toyota (JP); Naofumi Magarida, Toyota (JP); Masaaki Kobayashi, Toyota (JP); Daisuke Shibata, Toyota (JP); Akihiro Negami, Toyota (JP); Tomihisa Oda, Toyota (JP); Yasuo Harada, Toyota (JP); Tomoyuki Ono, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/088,207

(22) PCT Filed: Jul. 18, 2001

(86) PCT No.: PCT/JP01/06249

§ 371 (c)(1),
(2), (4) Date: Mar. 15, 2002

(87) PCT Pub. No.: WO02/08583

PCT Pub. Date: Jan. 31, 2002

(65) Prior Publication Data

US 2002/0148219 A1 Oct. 17, 2002

(30) Foreign Application Priority Data

Jul. 24, 2000 (JP) ............................... 2000-223055

(51) Int. Cl.$^7$ ................................................ F01N 3/00
(52) U.S. Cl. .................... 60/286; 60/285; 60/295; 60/301
(58) Field of Search ................ 60/286, 301, 295, 60/285

(56) References Cited

U.S. PATENT DOCUMENTS

| 5,116,579 A | * | 5/1992 | Kobayashi et al. | .......... 422/111 |
| 5,628,186 A | * | 5/1997 | Schmelz | ...................... 60/274 |
| 6,119,448 A | * | 9/2000 | Emmerling et al. | .......... 60/274 |
| 6,209,315 B1 | * | 4/2001 | Weigl | ........................... 60/274 |
| 6,311,484 B1 | * | 11/2001 | Roth et al. | ..................... 60/301 |

FOREIGN PATENT DOCUMENTS

| JP | A 5-263624 | 10/1993 |
| JP | A 6-129239 | 5/1994 |
| JP | A 6-272539 | 9/1994 |
| JP | 6-73317 U | 10/1994 |
| JP | A 7-102948 | 4/1995 |
| JP | A 8-200047 | 8/1996 |
| JP | A 8-260947 | 10/1996 |

* cited by examiner

Primary Examiner—Thomas Denion
Assistant Examiner—Diem Tran
(74) Attorney, Agent, or Firm—Oliff & Berridge, PLC

(57) ABSTRACT

A NOx catalyst in the exhaust passage of an internal combustion engine is capable of lean burn and adapted to release and reduce absorbed NOx by a reducing agent. Reducing agent supplier is provided in the exhaust passage on the upstream side of the NOx catalyst. A load detector detects the load of an internal combustion engine. Reducing agent addition controller controls the reducing agent addition period and the reducing agent addition interval based on the load of the internal combustion engine, whereby sufficient reducing agent is supplied to the NOx catalyst side independently of the operating condition.

14 Claims, 6 Drawing Sheets

AIR FUEL RATIO AT EXHAUST PORT

AIR FUEL RATIO OF GAS
FLOWING INTO NOx CATALYST

EXHAUST EMISSION CONTROL DEVICE OF INTERNAL COMBUSTION ENGINE

TECHNICAL FIELD

The present invention relates to an exhaust emission control device for cleaning exhaust gas discharged from an internal combustion engine capable of lean burn.

BACKGROUND ART

Examples of an exhaust emission control device for cleaning exhaust gas discharged from an internal combustion engine capable of lean burn, such as a diesel engine or a lean burn gasoline engine, include NOx catalysts, such as a selective reduction type NOx catalyst and an occlusion reduction type NOx catalyst.

The selective reduction type NOx catalyst is a catalyst which reduces or decomposes NOx in an atmosphere with excess oxygen in the presence of hydrocarbon (HC). To clean NOx with the selective reduction type NOx catalyst, an appropriate amount of HC component (hereinafter referred to as reducing agent) is required.

When using the selective reduction type NOx catalyst for the exhaust emission control of an internal combustion engine as mentioned above, the amount of HC component in the exhaust gas during normal operation of the internal combustion engine is very small, so that in order to clean NOx during normal operation, it is necessary to supply as a reducing agent, for example, light oil serving as fuel to the selective reduction type NOx catalyst.

On the other hand, the occlusion reduction type NOx catalyst absorbs NOx when the air fuel ratio of the inflow exhaust gas is lean, and releases the absorbed NOx when the oxygen concentration of the inflow exhaust gas is reduced, effecting reduction to $N_2$.

When using the occlusion reduction type NOx catalyst for exhaust emission control of the internal combustion engine, the NOx in the exhaust gas will be absorbed by the NOx catalyst since the air fuel ratio of the exhaust gas during normal operation of the internal combustion engine is lean. However, when exhaust gas of lean air fuel ratio is continued to be supplied to the NOx catalyst, the NOx absorbing capacity of the NOx catalyst attains saturation, and no further NOx can be absorbed, with the result that the NOx in the exhaust gas is allowed to leak.

In view of the above, in the occlusion reduction type NOx catalyst, it is necessary to reduce the oxygen concentration by making the air fuel ratio of the inflow exhaust gas rich with a predetermined timing before the NOx absorbing capacity attains saturation, and to release the NOx absorbed by the NOx catalyst to reduce it to $N_2$, thereby recovering the NOx absorbing capacity of the NOx catalyst. In the following, this operation of temporarily making the air fuel ratio of the inflow exhaust gas rich will be referred to as rich spike.

On the other hand, to recover the NOx absorbing capacity of the NOx catalyst, it is necessary to appropriately enrich the air fuel ratio of exhaust. Conventionally, the pattern in which fuel as reducing agent is added and the target fuel addition pressure are set on the basis of a map indicating the relationship between the internal combustion engine RPM and fuel injection amount obtained through experiment.

However, when supplying reducing agent at the exhaust port of an internal combustion engine, the exhaust port and the NOx catalyst are usually spaced apart from each other, and the reducing agent is not easily carried by the exhaust flow depending upon the operating condition of the internal combustion engine, resulting in a rather poor efficiency in the supply of reducing agent. Specifically, in the range where the internal combustion engine operates at low speed and with small load, the exhaust velocity is low, and the exhaust gas temperature is low, so that a part of the reducing agent added adheres to the wall surface in the exhaust passage, with the result that the degree of rich spike at the exhaust port differs from the degree of rich spike at the NOx catalyst. In other words, even if the rich spike on the exhaust port side attains the target air fuel ratio, the amount of reducing agent reaching the NOx catalyst decreases due to the adhesion to the wall surface on the NOx catalyst side, resulting in a decrease in the degree of richness. Further, the rich spike, effected instantaneously, involves a delay in reaction on the NOx catalyst side, with the result that the rich period is extended and the degree of richness becomes lower than the target air fuel ratio.

For example, even if the degree of rich spike at the exhaust port is approximately the one as shown in FIG. 6(A), the degree of richness is lowered with the NOx catalyst as shown in FIG. 6(B). Thus, the target air fuel ratio cannot be attained with the NOx catalyst, and the release and reduction of NOx cannot be effected to a sufficient degree. Then, in some cases, the NOx absorbing capacity of the NOx catalyst attains saturation and cannot be recovered, resulting in leakage of NOx in the exhaust.

The present invention has been made in view of the above problems. It is an object of the present invention to provide an exhaust emission control device for an internal combustion engine capable of supplying an appropriate amount of reducing agent to NOx catalyst even if the operating condition of the internal combustion engine changes.

DISCLOSURE OF THE INVENTION

The present invention relates to an exhaust emission control device for an internal combustion engine, characterized by comprising:

an NOx catalyst provided in an exhaust passage of an internal combustion engine capable of lean burn and adapted to release absorbed NOx by a reducing agent for reduction;

a reducing agent supplying means provided in the exhaust passage on the upstream side of the NOx catalyst;

a load detecting means for detecting the load of the internal combustion engine; and a reducing agent addition control means for controlling reducing agent addition period and reducing agent addition interval on the basis of the load of the internal combustion engine.

In accordance with the present invention, it is desirable to further provide an addition determining means for determining as to whether reducing agent is to be added or not according to the operating condition of the vehicle, the addition amount of reducing agent and the reducing agent addition interval being controlled on the basis of the load detected by the load detecting means when it is determined by the addition determining means that addition is possible.

It is desirable that a judgment be made by the addition determining means as to whether the NOx catalyst is at an activation temperature or not, whether the operation range of the internal combustion engine is within the range where addition of reducing agent is possible or not, and the like, reducing agent being supplied only when release and reduction of NOx is possible, thereby preventing the reducing agent from passing through the NOx catalyst.

Further, when the load of the internal combustion engine is small, it is possible to increase the amount of reducing agent added and elongate the reducing agent addition interval as compared to the case in which the load of the internal combustion engine is large.

Further, the present invention relates to an exhaust emission control device for an internal combustion engine, characterized by comprising:

- an NOx catalyst provided in an exhaust passage of an internal combustion engine capable of lean burn and adapted to release absorbed NOx by a reducing agent for reduction;
- a reducing agent supplying means provided in the exhaust passage on the upstream side of the NOx catalyst;
- an operating condition detecting means for detecting the load and an RPM of the internal combustion engine; and
- a reducing agent addition control means for controlling reducing agent addition period and reducing agent addition interval on the basis of the detected load and the RPM of the internal combustion engine.

In the present invention, when the load and the RPM of the internal combustion engine are low, the velocity of the exhaust is low, and the reducing agent is not easily carried by the exhaust flow, so that the addition period and addition interval for the reducing agent added are controlled according to the engine load and the engine RPM. That is, when the load and RPM of the internal combustion engine are low, the addition period and addition interval for the reducing agent are increased. On the other hand, as the engine load increases, the addition period and addition interval for the reducing agent are reduced. The addition period and addition amount for the fuel are in a fixed relationship unless the addition pressure (fuel pressure) of the reducing agent varies, so that the addition amount of the reducing agent is in proportion to the addition period thereof.

Thus, in accordance with the present invention, the addition period and the addition interval for the reducing agent are controlled while taking into account, for example, the degree to which reducing agent adheres to the wall surface in the exhaust passage depending on the velocity, temperature, etc. of the exhaust of the internal combustion engine, making it possible to always supply a sufficient amount of reducing agent to the NOx catalyst side independently of the operating condition.

Further, when the load and RPM of the internal combustion engine are low, the amount of NOx generated is small, so that, by elongating the addition interval, the reducing agent previously added interferes with that subsequently added in the condition in which the velocity of the exhaust is low, whereby it is possible to prevent the degree of richness from increasing excessively.

Regarding the exhaust emission control device of the present invention, examples of an internal combustion engine capable of lean burn may include an in-cylinder direct injection type lean burn gasoline engine and a diesel engine.

The detection of the load by the operating condition detecting means can be effected on the basis, for example, of an output signal of an accelerator opening sensor or an output signal of an airflow meter indicating intake air amount. The detection of the engine RPM can be effected through calculation of an output pulse, for example, of a crank angle sensor.

Examples of the NOx catalyst in the exhaust emission control device of the present invention may include an occlusion reduction type NOx catalyst and a selective reduction type NOx catalyst.

The occlusion reduction type NOx catalyst is a catalyst which absorbs NOx when the air fuel ratio of inflow exhaust gas is lean and releases the absorbed NOx for reduction to $N_2$ when the oxygen concentration of the inflow exhaust gas decreases. The occlusion reduction type NOx catalyst uses, for example, alumina, as the support, which supports thereon, for example, at least one selected from the group consisting of: an alkali metal, such as potassium K, sodium Na, lithium Li, or cesium Cs, an alkaline earth metal, such as barium Ba, or calcium Ca, and a rare earth metal, such as lanthanum La or yttrium Y, and a precious metal, such as platinum Pt.

The selective reduction type NOx catalyst is a catalyst which reduces or decomposes NOx in an excess oxygen atmosphere and in the presence of hydrocarbon and it includes a catalyst in which zeolite supports a transition metal, such as Cu, that has undergone ion exchange, a catalyst in which zeolite or alumina supports a precious metal, and the like.

In the exhaust emission control device of the present invention, the reducing agent adding means may be formed by a reducing agent supply pump, a reducing agent injection nozzle provided in the exhaust passage, etc.

In the exhaust emission control device for an internal combustion engine of the present invention, even if the reducing agent adding position and the NOx catalyst are spaced apart from each other, the reducing agent can be supplied in an appropriate manner by controlling the addition period and the addition interval for the reducing agent. In particular, when the RPM and load of the internal combustion engine are low, the addition period and addition interval for the reducing agent are elongated, whereby, even if a part of the reducing agent adheres to the wall surface in the exhaust passage, it is possible for a sufficient amount of reducing agent to be carried to the NOx catalyst by the exhaust flow.

In this way, independently of the operating condition of the internal combustion engine, it is possible to cause an appropriate amount of reducing agent to reach the NOx catalyst, thereby effecting NOx reduction efficiently. Thus, it is actually possible to constantly maintain the NOx occlusion amount by the NOx catalyst at a level near zero, thereby achieving a high level of efficiency in NOx cleaning.

BEST MODE FOR CARRYING OUT THE INVENTION

The exhaust emission control device for an internal combustion engine in accordance with an embodiment of the present invention will now be described with reference to FIGS. 1 through 6. Note that, in the following embodiment, the exhaust emission control device for an internal combustion engine of the present invention is applied to a diesel engine for driving a vehicle.

Figure 1:
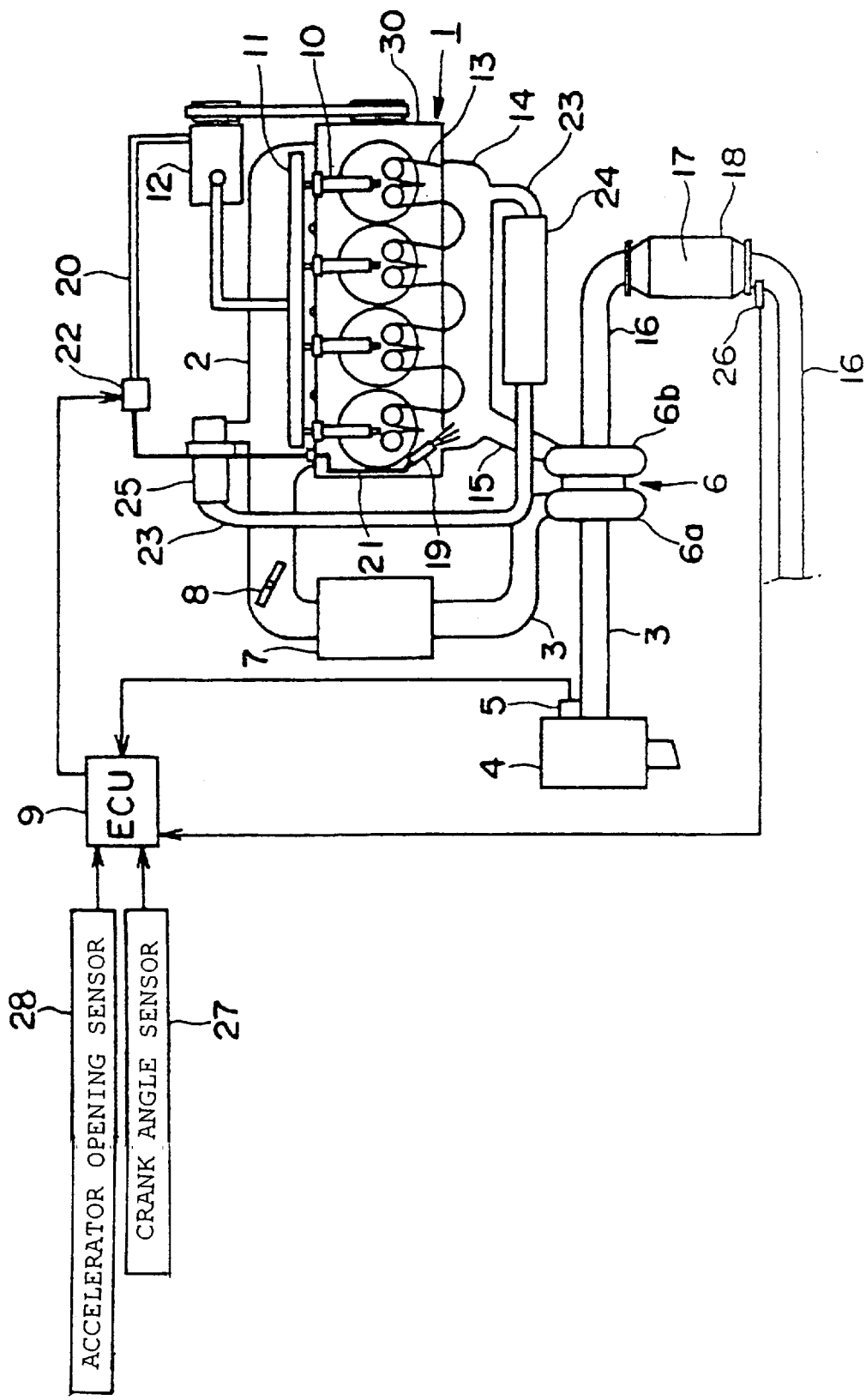
FIG. 1 is a schematic diagram showing an exhaust emission control device for an internal combustion engine according to the present invention.

FIG. 1 is a diagram showing the general construction of an exhaust emission control device for an internal combustion engine according to this embodiment. In the drawing, an engine 1 is a straight four-cylinder diesel engine, and intake air is introduced into the combustion chamber of each cylinder through an intake manifold 2 and an intake pipe 3. At the start end of the intake pipe 3, there is provided an air cleaner 4, and, in the midway of the intake pipe 3, there are provided an airflow meter 5, a compressor 6a of a turbo charger 6, an intercooler 7, and a throttle valve 8.

The airflow meter 5 outputs an output signal in correspondence with the amount of new air flowing into the intake pipe 3 through the air cleaner 4 to an engine control electronic control unit (ECU) 9, which calculates the intake air amount on the basis of the output signal of the airflow meter 5.

Further, fuel (gas oil) is injected into the combustion chamber of each cylinder of the engine 1 from a fuel injection valve 10. Each fuel injection valve 10 is connected to a common rail 11, to which fuel is supplied from a fuel pump 12. The fuel pump 12 is driven by a crank shaft (not shown) of the engine 1. The opening time and opening period of each fuel injection valve 10 are controlled by the ECU 9 according to the operating condition of the engine 1.

The exhaust gas generated in the combustion chamber of each cylinder of the engine 1 is discharged to an exhaust pipe 16 through an exhaust manifold 14, and discharged to the atmosphere through a muffler (not shown). A part of the exhaust gas discharged to the exhaust manifold 14 can be recycled to the intake manifold 2 through an exhaust reflux pipe 23, and an EGR cooler 24 and an EGR valve 25 are provided in the midway of the exhaust reflux pipe 23. The opening of the EGR valve 25 is controlled by the ECU 9 according to the operating condition of the engine 1, controlling the exhaust reflux amount.

Provided in the midway of the exhaust pipe 16 are a turbine 6b of a turbo charger 6 and a casing 18 accommodating an occlusion reduction type NOx catalyst (lean NOx catalyst). The turbine 6b is driven by the exhaust gas, which drives a compressor 6a connected to the turbine 6b to raise the pressure of the intake air.

Further, a fuel addition nozzle (addition port of a reducing agent adding device) 19 is mounted to the cylinder head 30 of the engine 1 so as to face the exhaust port 13 of the fourth cylinder. To the fuel addition nozzle 19, fuel pumped up by the fuel pump 12 can be supplied through a fuel pipe 20 and a fuel passage 21 provided in the cylinder head 30, the addition amount being controlled by a control valve 22 provided at some midpoint of the fuel pipe 20. The control valve 22 is opened and closed and opening-controlled by the ECU 9. The fuel addition nozzle 19 is mounted such that it is injected toward an exhaust collector pipe 15. In this embodiment, the fuel pump 12, the fuel addition nozzle 19, the fuel pipe 20, the fuel passage 21, and the control valve 22 constitute the reducing agent adding device.

In the midway of the EGR pipe 23, there are provided an EGR cooler 24 and an EGR valve 25. The EGR valve 25 is opening-controlled by the ECU 9 according to the operating condition of the engine 1 to control the exhaust reflux amount. The EGR pipe 23, the EGR cooler 24, and the EGR valve 25 constitute an exhaust gas recycle device (EGR).

Further, in the exhaust pipe 16, there is provided immediately on the downstream side of the casing 18 an exhaust gas temperature sensor 26 for outputting an output signal corresponding to the temperature of the exhaust gas flowing out of the casing 18 to the ECU 9.

The ECU 9 consists of a digital computer and comprises a ROM (read only memory), a RAM (random access memory), a CPU (central processor unit), an input port, and an output port which are mutually connected by a two-way bus, performing basic controls, such as control of fuel injection amount of the engine 1.

For these controls, an input signal from an accelerator opening sensor 28 and an input signal from a crank angle sensor 27 are input to the input port of the ECU 9. The accelerator opening sensor 28 outputs an output voltage in proportion to the accelerator opening to the ECU 9, and the ECU 9 calculates the engine load on the basis of the output signal of the accelerator opening sensor 28. Each time the crank shaft rotates by a fixed angle, the crank angle sensor 27 outputs an output pulse to the ECU 9, which calculates the engine RPM on the basis of this output pulse. The engine operating condition is judged by the engine load and the engine RPM, and the ECU 9 calculates the fuel injection amount according to the engine operating condition with reference to an injection amount map (not shown), calculating the valve opening period of the fuel injection valve 10 corresponding to the calculated fuel injection amount to thereby control the operation of the fuel injection valve 10.

Next, the occlusion reduction type NOx catalyst (hereinafter sometimes referred to as NOx catalyst) accommodated in the casing 18 will be described.

The occlusion reduction type NOx catalyst uses, for example, alumina ($Al_2O_3$), as the support, on which are supported at least one selected from the group consisting of: an alkali metal, such as potassium K, sodium Na, lithium Li, or cesium Cs, an alkaline earth metal, such as barium Ba, or calcium Ca, and a rare earth metal, such as lanthanum La or yttrium Y, and a precious metal, such as platinum Pt.

This NOx catalyst effects absorption and release operations of NOx in which it absorbs NOx when the air fuel ratio of the inflow exhaust (hereinafter referred to as exhaust air fuel ratio) is leaner than the stoichiometric air fuel ratio, and releases the absorbed NOx in the form of $NO_2$ or NO when the exhaust air fuel ratio becomes equal to or richer than the stoichiometric air fuel ratio to cause a reduction in the oxygen concentration of the inflow exhaust gas. Then, NOx ($NO_2$ or NO) released from the NOx catalyst immediately reacts with the unburned HC and CO in the exhaust gas to be reduced to $N_2$. Thus, by appropriately controlling the exhaust air fuel ratio, it is possible to clean the HC, CO, and NOx in the exhaust gas.

Here, the term exhaust air fuel ratio means the ratio of the total amount of air supplied to the exhaust passage on the upstream side of the NOx catalyst, the engine combustion chamber, the intake passage, etc. to the total amount of fuel (hydrocarbon). Thus, when no fuel, reducing agent, or air is supplied to the exhaust passage on the upstream side of the NOx catalyst, the exhaust air fuel ratio coincides with the air fuel ratio of the mixture supplied to the engine combustion chamber.

Note that, in the case of a diesel engine, combustion is effected in a range in which the air fuel ratio is much leaner than in the stoichiometric range (A/F=14 to 15), so that, in the normal engine operating condition, the air fuel ratio of the exhaust gas flowing into the NOx catalyst is very lean, and the NOx in the exhaust gas is absorbed by the NOx catalyst, the amount of NOx released from the NOx catalyst being very small.

Further, in the case of a gasoline engine, the air fuel ratio of the exhaust gas is made stoichiometric or rich by making the air fuel ratio of the mixture supplied to the combustion chamber stoichiometric or rich, and the oxygen concentration of the exhaust gas is lowered, enabling the NOx absorbed by the NOx catalyst to be released. In the case of a diesel engine, however, this method cannot be adopted since it involves problems, for example, of generation of soot at the time of combustion when the air fuel ratio of the mixture supplied to the combustion chamber is made stoichiometric or rich.

Thus, in a diesel engine, it is necessary to supply reducing agent to the exhaust gas with a predetermined timing to lower the oxygen concentration of the exhaust gas before the NOx absorption capacity of the NOx catalyst has attained saturation, discharging and reducing the NOx absorbed by the NOx catalyst. Generally speaking, the reducing agent can may consist of gas oil, which is a fuel for a diesel engine.

Thus, in this embodiment, the amount of NOx absorbed by the NOx catalyst is estimated by the ECU 9 from the history of the operating condition of the engine 1, and when the estimated amount of NOx attains a predetermined value, the control valve 22 is kept open for a predetermined period of time to inject a predetermined amount of fuel into the exhaust from the fuel addition nozzle 19 to thereby lower the oxygen concentration of the exhaust flowing into the NOx catalyst, discharging the NOx absorbed by the NOx catalyst and reducing it to $N_2$.

At this time, since the fuel addition nozzle 19 ejects fuel toward the exhaust collector pipe 15, the added fuel flows smoothly to the exhaust connector pipe 15. The fuel addition nozzle 19 is mounted to the exhaust port 13 of the fourth cylinder, whereas the connecting position of the EGR pipe 23 in the exhaust manifold 14 is close to the first cylinder, so that there is little possibility of the fuel added from the fuel addition nozzle 19 being allowed to get into the EGR pipe 23.

As stated above, when the NOx catalyst 17 is arranged in the exhaust passage, the NOx absorbing agent supported thereby absorbs and releases NOx. It is thought that the NOx absorption/reduction mechanism is as shown in FIG. 2. While the drawing illustrates a case in which platinum Pt and barium Ba are supported onto a support, a similar mechanism can be also realized by using other precious metals, alkali metals, alkaline earth metals, or rare earth metals. The mechanism will now be schematically described.

Figure 2A:
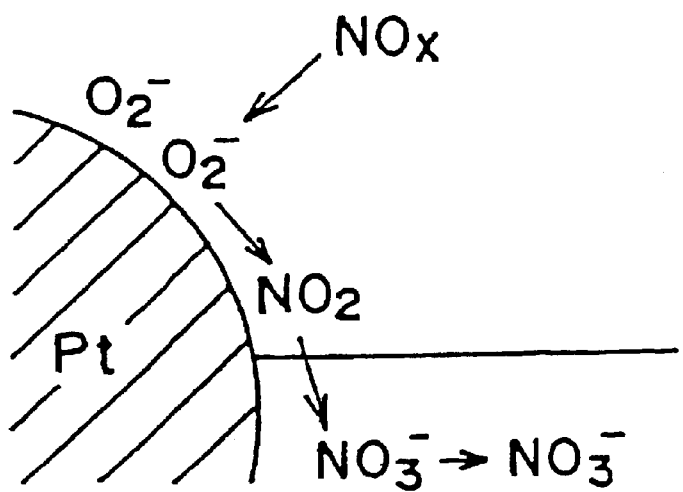
FIG. 2 is a diagram illustrating the absorption and release operations of NOx by an occlusion reduction type NOx catalyst.

First, when the inflow exhaust gas continues to be in a lean state, the oxygen concentration of the inflow exhaust gas increases, and, as shown in FIG. 2(A), the oxygen $O_2$, whose amount has been increased, adheres to the surface of the platinum Pt as $O_2^-$ or $O^{2-}$. This $O_2^-$ or $O^{2-}$ reacts with the NO in the inflow exhaust gas to produce $NO_2$ ($2NO+O_2 \rightarrow 2NO_2$). A part of the $NO_2$ thus produced is absorbed by the NOx absorbing agent to be combined with barium oxide BaO while being further oxidized on the platinum Pt. As a result, it is diffused into the NOx absorbing agent as nitrate ions $NO_3^-$, as shown in FIG. 2(A). In this way, NOx is absorbed by the NOx absorbing agent.

While the oxygen concentration of the inflow exhaust gas is high, $NO_2$ is produced on the surface of the platinum Pt. Until the absorption capacity of the NOx absorbing agent attains saturation, $NO_2$ continues to be absorbed by the NOx absorbing agent to produce nitrate ions $NO_3^-$.

On the contrary, when the oxygen concentration of the inflow exhaust gas is lowered and the production amount of $NO_2$ is reduced, the reaction is reversed ($NO_3^- \rightarrow NO_2$), and the nitrate ions $NO_3^-$ in the NOx absorbing agent are released from the NOx absorbing agent as $NO_2$. That is, when the oxygen concentration of the inflow exhaust gas is lowered, NOx is released from the NOx absorbing agent. However, when the degree of leanness of the inflow exhaust gas is low, the oxygen concentration of the inflow exhaust gas is lowered.

Figure 2B:
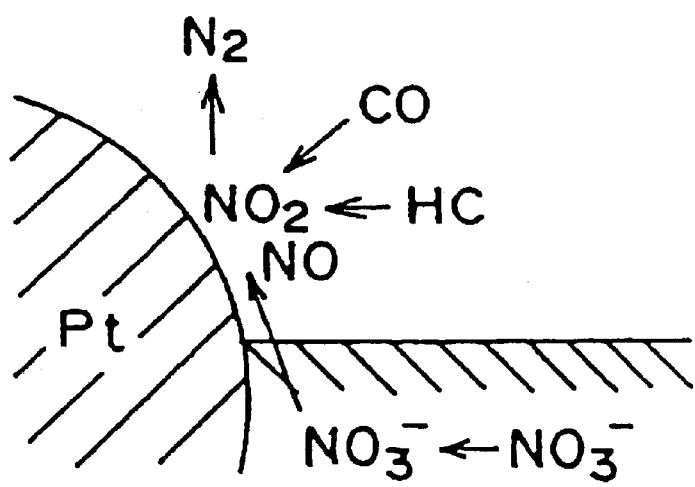

On the other hand, when the air fuel ratio of the inflow exhaust gas is enriched, the HC and CO react with the oxygen $O_2^-$ or $O^{2-}$ on the platinum Pt to be thereby oxidized. Further, when the air fuel ratio of the inflow exhaust gas is rich, the oxygen concentration of the inflow exhaust gas is extremely lowered, so that $NO_2$ is released from the NOx absorbing agent. As shown in FIG. 2(B), this $NO_2$ reacts with the unburned HC and CO to be thereby reduced and cleaned. When $NO_2$ thus ceases to exist on the surface of the platinum Pt, $NO_2$ is successively released from the NOx absorbing agent.

Thus, when the air fuel ratio of the inflow exhaust gas is enriched, NOx is released from the NOx absorbing agent and reduced and cleaned in a short time.

In this embodiment, a diesel engine is used, so that the exhaust air fuel ratio during normal operation is lean, and the NOx absorbing agent absorbs the NOx in the exhaust. When a reducing agent is supplied to the exhaust port on the upstream side of the NOx catalyst 17, the air fuel ratio of the exhaust gas passing through this NOx catalyst 17 becomes rich, and NOx is released from the NOx absorbing agent and reduced.

Here, the term "exhaust air fuel ratio" means ratio of the air to the fuel, the air and fuel being supplied to the exhaust port on the upstream side of the NOx absorbing agent and the engine combustion chamber or the intake passage. Thus, when no air or reducing agent is supplied to the exhaust port, the exhaust air fuel ratio is equal to the operating air fuel ratio of the engine (combustion air fuel ratio in the engine combustion chamber).

In the present invention, there is no particular limitation regarding the reducing agent as long as it generates a reduction component, such as hydrocarbon or carbon monoxide, in the exhaust. Examples of the reducing agent that can be used include gases, such as hydrogen and carbon monoxide, liquid or gas hydrocarbons, such as propane, propylene, and butane, and liquid fuels, such as gasoline, gas oil, and kerosene. In this case, as stated above, gas oil, which is the fuel for the engine 1, is used as the reducing agent in order to avoid complexity in storage, supply, etc.

Generally speaking, the reducing agent supplying conditions include the pressure at which the reducing agent (which is fuel in this embodiment) is supplied (i.e., the injection pressure), the supply period, and the supply interval, which mean nothing other than the fuel supply amount. Here, the addition period and the addition interval for the fuel to be added are controlled according to the operating condition, whereby NOx is released and reduced efficiently.

In the following, a case will be described in which, when supplying reducing agent at the exhaust port 13 from the fuel addition nozzle 19, the load condition of the engine 1 is judged, and the addition period and the addition interval for the fuel (gas oil) as the reducing agent are controlled according, in particular, to the exhaust velocity.

In this control, the operating condition for the engine 1 is first read by the ECU 9. As stated above, the ECU 9 calculates the engine load on the basis of the output signal of the accelerator opening sensor 28, and calculates the engine RPM on the basis of the output pulse of the crank angle sensor 27. The engine operating condition is judged by the engine load and the engine RPM, and the ECU 9 calculates the fuel injection amount according to the engine operating condition with reference to an injection amount map (not shown).

Subsequently, the amount of NOx absorbed by the NOx catalyst is estimated by the ECU 9 from the history of the operating condition of the engine 1. When the estimated amount of NOx has reached a predetermined value, fuel is injected into the exhaust from the fuel addition nozzle 19.

The ECU 9 calculates the engine load as described above. Further, on the basis of a signal from the exhaust gas temperature sensor 26 provided on the downstream side of the NOx catalyst 17, it adopts this as the bed temperature of the NOx catalyst 17. The bed temperature of the NOx catalyst 17 is used when making a judgment as to whether reducing agent is to be supplied or not. When it is not within a predetermined temperature range, that is, when the NOx catalyst 17 is not within the activation range, no reducing agent is supplied.

Further, the ECU 9 determines the addition period P for the fuel as the reducing agent from the operating condition based on the amount of fuel Q injected into the engine 1 and the engine RPM Ne. This addition period P is previously obtained by experiment in the form of a map as shown in FIG. 3(B) as a function of the amount of fuel Q injected into the engine 1 and the engine RPM Ne, and is stored in the ROM of the ECU 9.

Figure 3A:
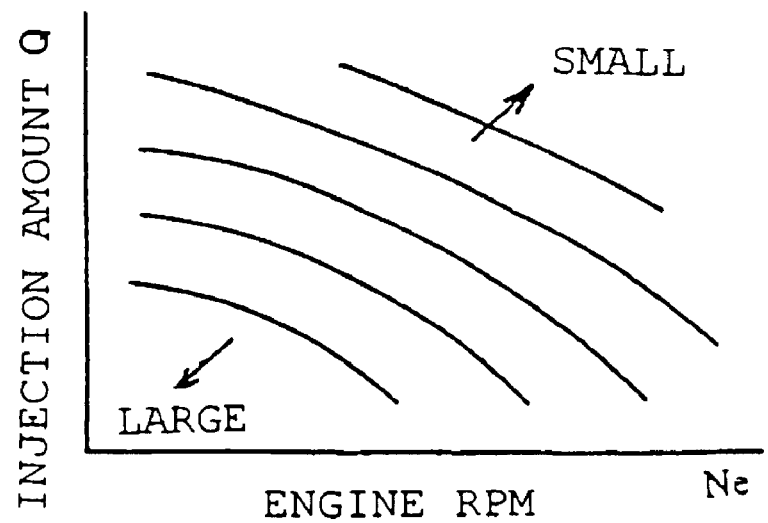
FIG. 3 is a diagram showing the relationship between fuel addition injection period, engine RPM, and fuel injection amount.
Figure 3B:
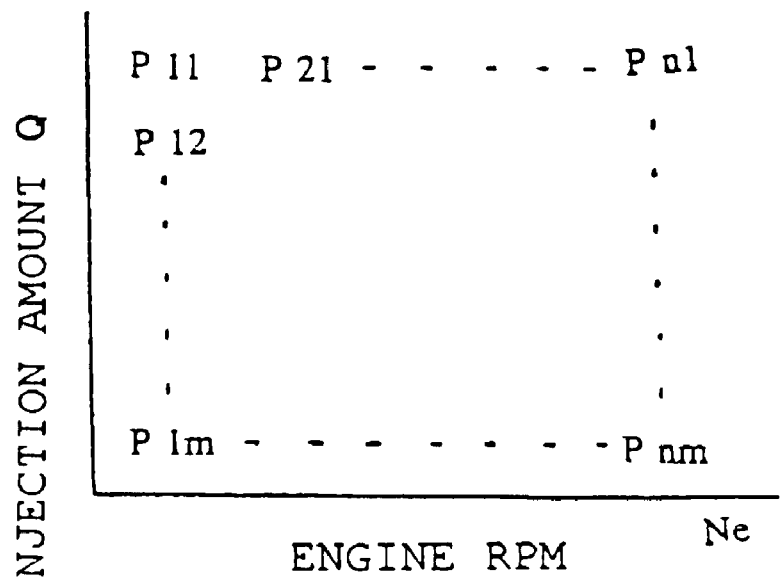

As shown in FIG. 3(A), regarding the addition period P for the fuel, the less the fuel injection amount Q, the longer the addition period P for the fuel as the reducing agent, the addition period P decreasing as the fuel injection amount Q increases. When the fuel injection amount Q is small, the addition period P is substantially constant even if the engine RPM Ne is raised. However, as the fuel injection amount Q increases, the addition period P becomes still shorter as a result of an increase in the engine RPM Ne.

Figure 4A:
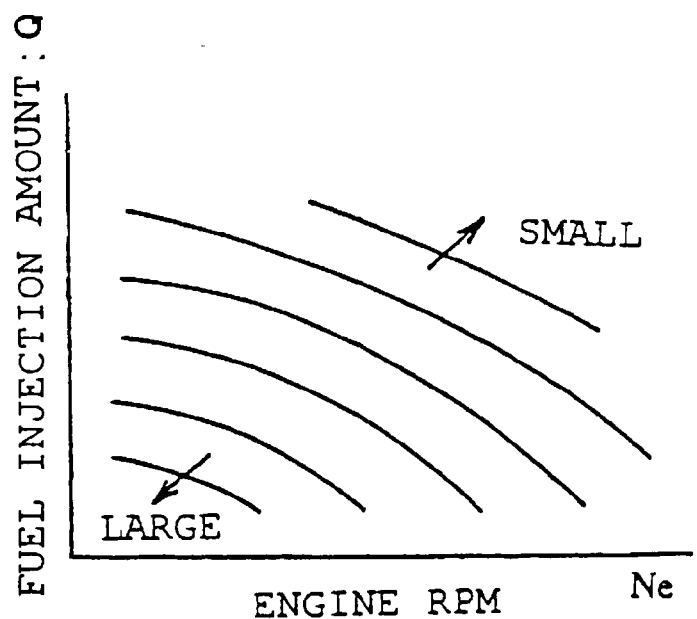
FIG. 4 is a diagram showing the relationship between fuel addition interval, engine RPM, and fuel injection amount.

On the other hand, as shown in FIG. 4(A), an addition interval I for the fuel is determined such that the less the amount of fuel Q injected to the engine 1, the longer the addition interval I for the fuel, the addition interval I decreasing as the fuel injection amount Q increases.

Figure 4B:
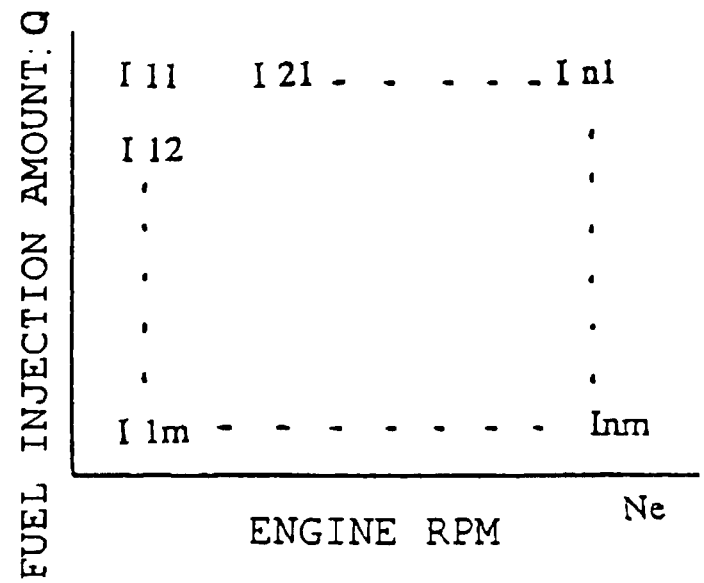

Further, the addition interval I for the reducing agent is previously stored in the ROM of the ECU 9 in the form of a map as shown in FIG. 4(B) as a function of the engine RPM Ne and the fuel injection amount Q. Normally, when the engine RPM Ne is low, the addition interval I is long, the addition interval I decreasing as the engine RPM Ne increases.

Note that, when the pressure acting on the reducing agent injected from the fuel addition nozzle 19 is constant, the addition period P and the reducing agent injection amount are in a fixed relationship. Thus, by controlling the length of the addition period P for the reducing agent as described above, the injection amount of the reducing agent is increased or decreased according to the operating condition of the engine 1.

Figure 5:
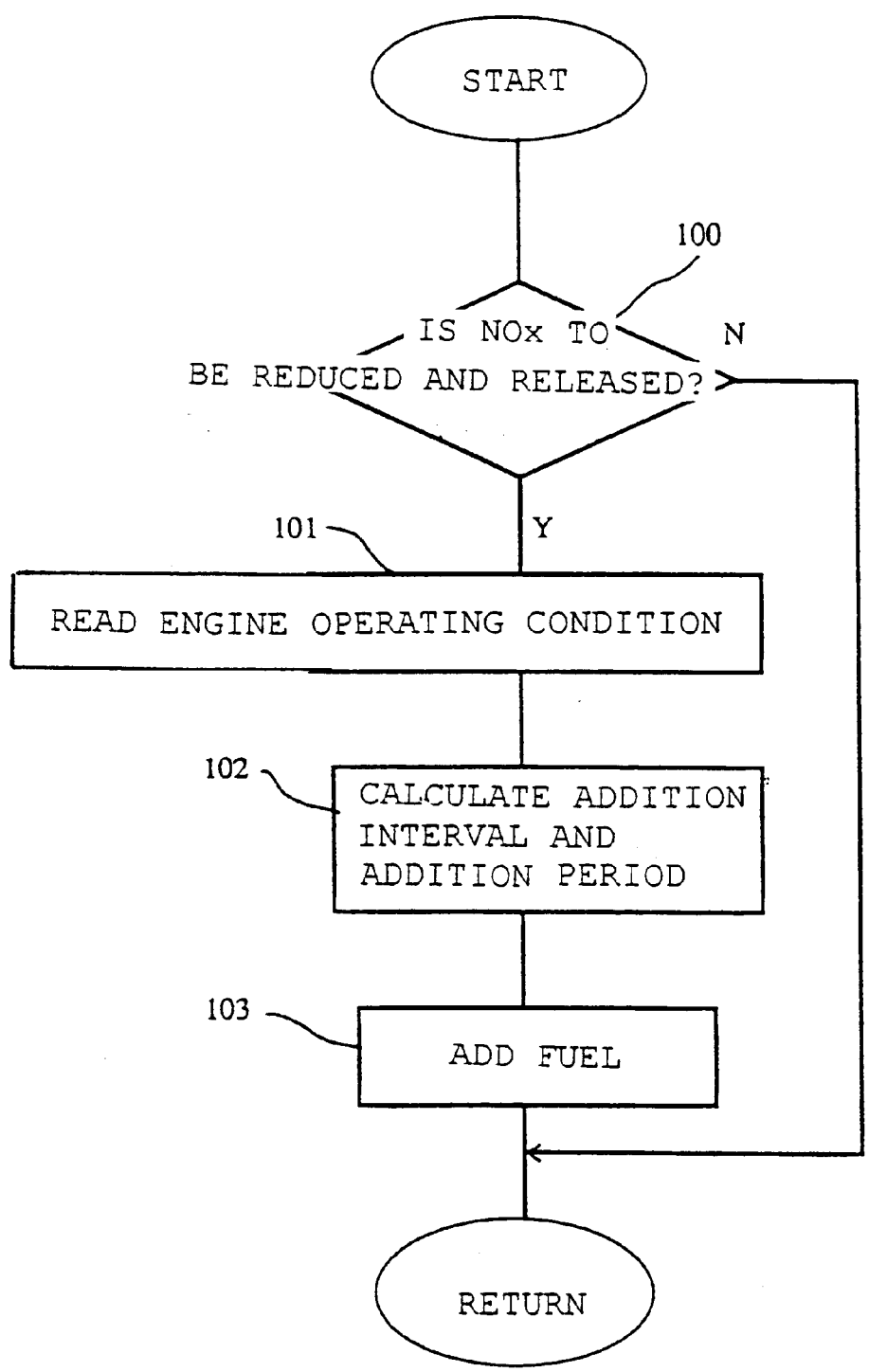
FIG. 5 is a flowchart illustrating a fuel addition routine.
Figure 6A:
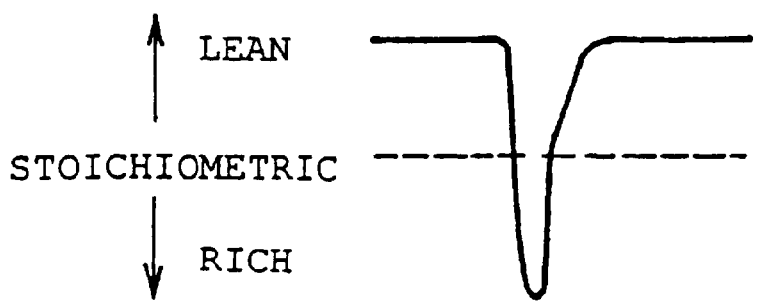
FIG. 6 is a diagram showing the rich spike air fuel ratios at the exhaust port and the NOx catalyst.
Figure 6B:
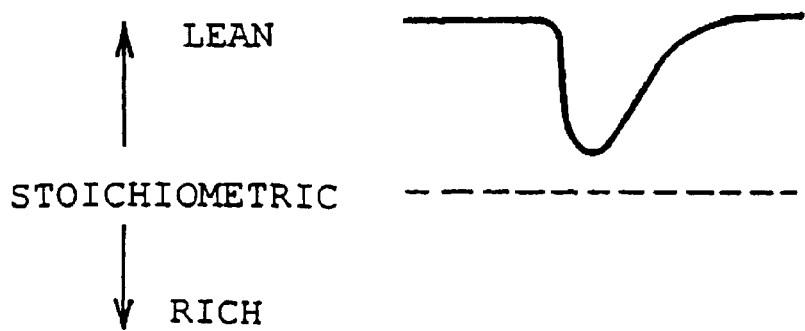

This reducing agent addition control is executed in accordance with the reducing agent addition routine shown in FIG. 5. This processing routine is previously stored in the ROM of the ECU 9, and is repeatedly executed by the CPU.

First, in step 100, a judgment is made as to whether NOx is to be reduced and released. When it is determined that reduction and releasing of NOx is not to be executed on the basis of the NOx occlusion amount at the NOx catalyst 17 estimated from the operation history, the engine operating condition, the catalyst bed temperature, etc., this routine is temporarily terminated.

On the other hand, if it is determined that NOx is to be reduced and released on the basis of the operation history, etc., the procedure advances to step 101.

In step 101, the ECU 9 reads the engine load and the operating conditions of the engine 1, such as the engine RPM.

Then, in step 102, the ECU 9 calculates the addition period and the addition interval for the fuel as the reducing agent on the basis of the operating conditions of the engine 1 read in step 101.

In step 103, the addition of the fuel is executed on the basis of the calculated addition period and addition interval for the fuel.

While in the above-described embodiment the present invention is applied to a diesel engine by way of an example, the present invention is also applicable to a gasoline engine capable of lean burn.

INDUSTRIAL APPLICABILITY

The exhaust emission control device for an internal combustion engine of the present invention is capable of efficiently cleaning NOx in the exhaust gas discharged from a lean burn engine, such as diesel engine. Thus, it can be widely used, in particular, in vehicle-mounted lean burn engines.

What is claimed is:

1. An exhaust emission control device for an internal combustion engine, comprising:
    an NOx catalyst provided in an exhaust passage of an internal combustion engine capable of lean burn and adapted to release absorbed NOx by a reducing agent for reduction;
    a reducing agent supplying means provided in the exhaust passage on an upstream side of the NOx catalyst for adding an amount of the reducing agent;
    a load detecting means for detecting a load of the internal combustion engine;
    a reducing agent addition control means for controlling a reducing agent addition period and a reducing agent addition interval based on the load of the internal combustion engine; and
    an addition determining means for determining whether or not the reducing agent is to be added according to an operating condition of the vehicle, wherein
        the addition amount of the reducing agent and the reducing agent addition interval are controlled based on the load detected by the load detecting means when the addition determining means determines that adding the reducing agent is possible, and
        the amount of the reducing agent to be added is increased and the reducing agent addition interval is elongated when the load of the internal combustion engine is small, as compared to when the load of the internal combustion engine is large.

2. The exhaust emission control device for an internal combustion engine according to claim 1, wherein the amount of the reducing agent added is larger and the reducing agent addition interval is longer when the load of the internal combustion engine is small and the RPM thereof is low than when the load of the internal combustion engine is large and the RPM thereof is high.

3. The exhaust emission control device for an internal combustion engine according to claim 1, wherein the NOx catalyst is a storage reduction type NOx catalyst.

4. The exhaust emission control device for an internal combustion engine according to claim 1, wherein said reducing agent supplying means consists of a reducing agent injection nozzle for injecting the reducing agent into the exhaust passage on the upstream side of the NOx catalyst.

5. An exhaust emission control device for an internal combustion engine, comprising:

an NOx catalyst provided in an exhaust passage of an internal combustion engine capable of lean burn and adapted to release absorbed NOx by a reducing agent for reduction;

a reducing agent supplying means provided in the exhaust passage on an upstream side of the NOx catalyst for adding an amount of the reducing agent;

a load detecting means for detecting a load of the internal combustion engine;

a reducing agent addition control means for controlling a reducing agent addition period and a reducing agent addition interval based on the load of the internal combustion engine; and an addition determining means for determining whether or not the reducing agent is to be added according to an operating condition of the vehicle, wherein the addition amount of the reducing agent and the reducing agent addition interval are controlled based on the load detected by the load detecting means when the addition determining means determines that adding the reducing agent is possible, and the amount of the reducing agent added is larger and the reducing agent addition interval is longer when the load of the internal combustion engine is small and an RPM thereof is low as compared to when the load of the internal combustion engine is large and the RPM thereof is high.

6. The exhaust emission control device for an internal combustion engine according to claim 5, wherein the NOx catalyst is a storage reduction type NOx catalyst.

7. The exhaust emission control device for an internal combustion engine according to claim 5, wherein said reducing agent supplying means consists of a reducing agent injection nozzle for injecting reducing agent into the exhaust passage on the upstream side of the NOx catalyst.

8. An exhaust emission control device for an internal combustion engine, comprising:

an NOx catalyst provided in an exhaust passage of an internal combustion engine capable of lean burn and adapted to release absorbed NOx by a reducing agent for reduction;

a reducing agent supplying means provided in the exhaust passage on an upstream side of the NOx catalyst for adding an amount of the reducing agent;

a load detecting means for detecting a load of the internal combustion engine; and a reducing agent addition control means for controlling a reducing agent addition period and a reducing agent addition interval based on the load of the internal combustion engine, wherein the amount of the reducing agent to be added is increased and the reducing agent addition interval is elongated when the load of the internal combustion engine is small, as compared to when the load of the internal combustion engine is large.

9. The exhaust emission control device for an internal combustion engine according to claim 8, wherein the amount of the reducing agent added is larger and the reducing agent addition interval is longer when the load of the internal combustion engine is small and an RPM thereof is low than when the load of the internal combustion engine is large and the RPM thereof is high.

10. The exhaust emission control device for an internal combustion engine according to claim 8, wherein the NOx catalyst is a storage reduction type NOx catalyst.

11. The exhaust emission control device for an internal combustion engine according to claim 8, wherein the reducing agent supplying means is a reducing agent injection nozzle for injecting the reducing agent into the exhaust passage on the upstream side of the NOx catalyst.

12. An exhaust emission control device for an internal combustion, comprising:

an NOx catalyst provided in an exhaust passage of an internal combustion engine capable of lean burn and adapted to release absorbed NOx by a reducing agent for reduction;

a reducing agent supplying means provided in the exhaust passage on an upstream side of the NOx catalyst for adding an amount of the reducing agent;

an operating condition detecting means for detecting a load and an RPM of the internal combustion engine; and a reducing agent addition control means for controlling reducing agent addition period and reducing agent addition interval based on the load and the RPM of the internal combustion engine, wherein the amount of the reducing agent to be added is increased and the reducing agent addition interval is elongated when the load of the internal combustion engine is small and the RPM thereof is low as compared to when the load of the internal combustion engine is large and the RPM thereof is high.

13. The exhaust emission control device for an internal combustion engine according to claim 12, wherein the NOx catalyst is an occlusion reduction type NOx catalyst.

14. The exhaust emission control device for an internal combustion engine according to claim 12, wherein said reducing agent supplying means consists of a reducing agent injection nozzle for injecting reducing agent into the exhaust passage on the upstream side of the NOx catalyst.

* * * * *

UNITED STATES PATENT AND TRADEMARK OFFICE
CERTIFICATE OF CORRECTION

PATENT NO. : 6,619,035 B2
DATED : September 16, 2003
INVENTOR(S) : Hiroki Matsuoka et al.

It is certified that error appears in the above-identified patent and that said Letters Patent is hereby corrected as shown below:

Title page,
Item [54], Title, replace "EXHAUST EMISSION CONTROL DEVICE OF INTERNAL COMBUSTION ENGINE" with -- EXHAUST EMISSION CONTROL DEVICE FOR AN INTERNAL COMBUSTION ENGINE --;
Item [75], Inventors, replace "Yasuhiro Ohtsubo" with -- Yasuhiko Ohtsubo --, and replace "Akihiro Negami" with -- Akihiko Negami --; and Column 3,
Line 49, replace "agent previous added interferes with that subsequently" with -- agent previously added does not interfere with that subsequently --.

Signed and Sealed this

Twenty-eighth Day of June, 2005

JON W. DUDAS
*Director of the United States Patent and Trademark Office*